J. A. GLANCEY.
DIRECTION INDICATING SIGNAL.
APPLICATION FILED OCT. 19, 1921.
1,424,813.
Patented Aug. 8, 1922.
2 SHEETS—SHEET 1.
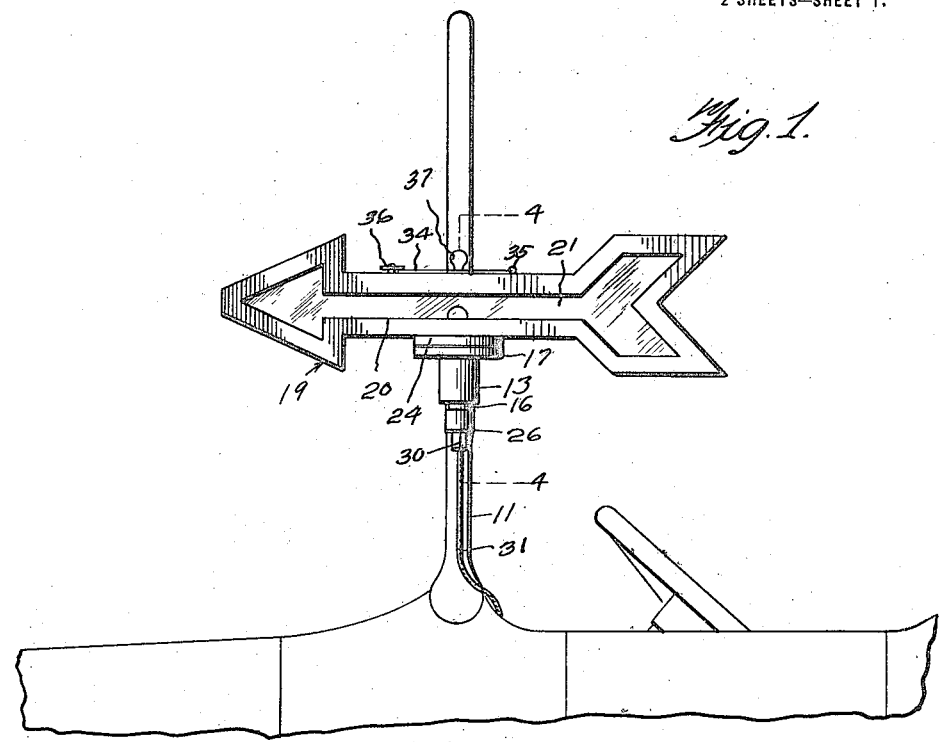
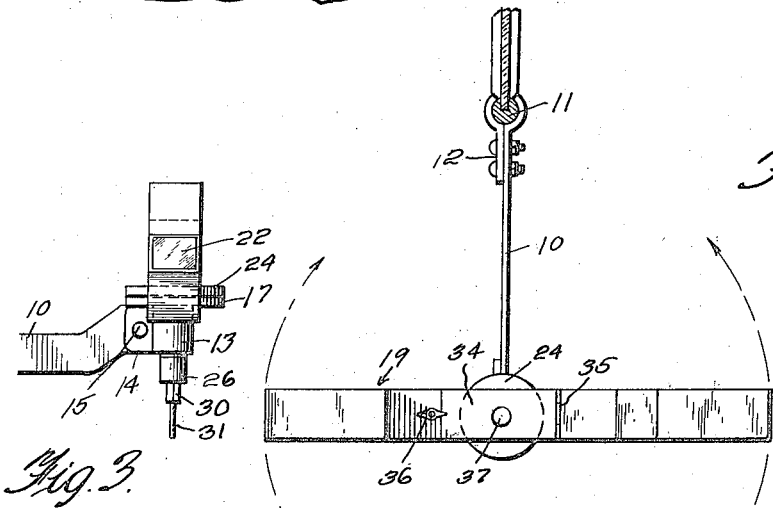
Inventor
J. A. Glancey,
Jerry R. Mathews,
By
Attorney

J. A. GLANCEY.
DIRECTION INDICATING SIGNAL.
APPLICATION FILED OCT. 19, 1921.

1,424,813.

Patented Aug. 8, 1922.
2 SHEETS—SHEET 2.

Inventor
J. A. Glancey,
Jerry A. Mathews,
By
Attorney

UNITED STATES PATENT OFFICE.

JOSEPH A. GLANCEY, OF ROCK ISLAND, ILLINOIS.

DIRECTION-INDICATING SIGNAL.

1,424,813.  Specification of Letters Patent.  Patented Aug. 8, 1922.

Application filed October 19, 1921. Serial No. 508,740.

*To all whom it may concern:*

Be it known that I, JOSEPH A. GLANCEY, a citizen of the United States, residing at Rock Island, in the county of Rock Island and State of Illinois, have invented certain new and useful Improvements in Direction-Indicating Signals, of which the following is a specification.

My invention relates to an illuminated signal apparatus, of the pivoted type, adapted for use in connection with automobiles or like vehicles, for indicating the direction of travel of the same.

An important object of the invention is to provide a signal apparatus of the above mentioned character, which is characterized by extreme simplicity, cheapness, and is adapted to successfully compete with other devices along the same line, in a highly crowded and developed art.

A further object of the invention is to provide a device of the above mentioned character, which is easy to adjust or set in the desired position, and is automatically retained in such set position.

Other objects and advantages of the invention will be apparent during the course of the following description.

In the accompanying drawings forming a part of this specification, and in which like numerals are employed to designate like parts throughout the same, Fig. 1 is a side elevation of apparatus embodying my invention, showing the same in use.

Fig. 2 is a plan view of the same,

Fig. 3 is a front end elevation of the device,

Figure 4:
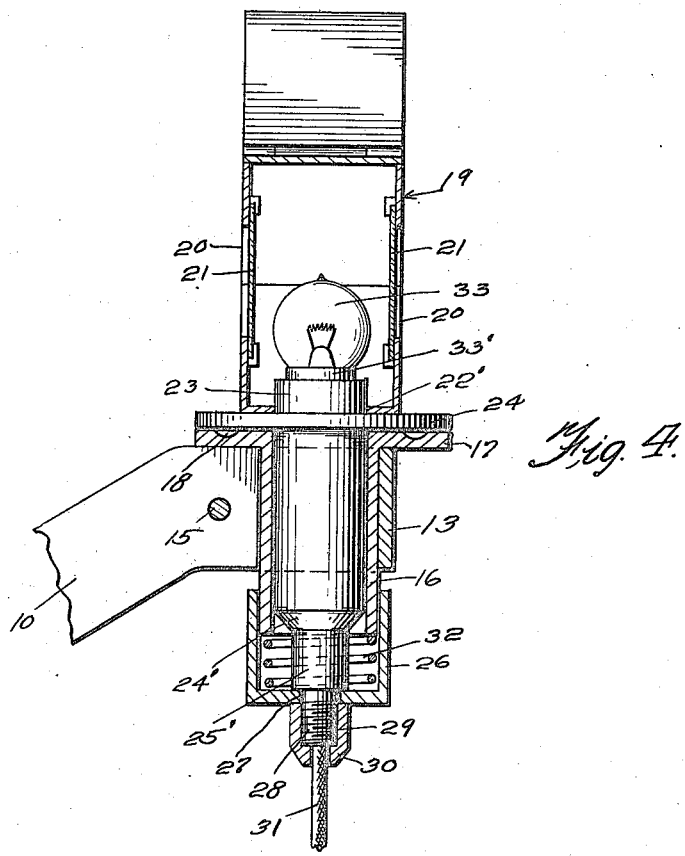
Fig. 4 is an enlarged transverse vertical section taken on line 4—4 of Figure 1.

In the drawings, wherein for the purpose of illustration is shown a preferred embodiment of my invention, the numeral 10 designates a horizontal arm, adapted to be arranged adjacent to the side of the windshield of an automobile and to extend laterally therefrom at a right angle to the body of the automobile. This arm may be rigidly secured to the frame or post 11 of the windshield by any suitable means, such as by means of a clamp 12, of any desired construction. The arm is provided at its outer end with a clamping socket or sleeve 13, preferably slightly resilient, and preferably formed by bending the end of the arm 10 back upon itself. The end of the socket 13 has an ear 14, which is adjustably connected with the arm 10 by means of an adjusting screw or bolt 15, as shown.

Figure 5:
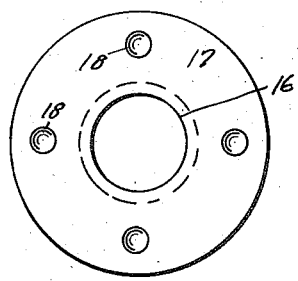
Fig. 5 is a plan view of the plate carried by the stationary casing, and, Fig. 6 is a bottom plan view of the plate carried by the pivoted tube or casing.
Figure 6:
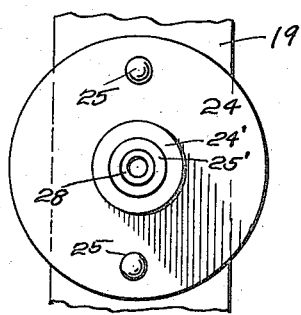

The numeral 16 designates a stationary tube or casing, which is preferably cylindrical. This casing is fitted within the socket 13 and is clamped therein, in a vertical position, and is held against turning movement. The upper end of the casing or tube 16 is provided with an annular horizontal plate or flange 17, provided upon its top, Fig. 5, with depressions 18, preferably arranged at 45° apart. The plate or flange 17 being integral with the sleeve is held stationary with relation to the arm 10. The casing 16 projects downwardly below the socket 13 for a substantial distance, as shown.

The numeral 19 designates an indicator casing, preferably in the shape of an arrow, and this casing may be formed of metal or any other suitable material. The casing may be provided in its opposite sides with opening 20, also preferably in the shape of an arrow and covered by transparent material 21, such as isinglass or the like. The transparent material 21 may be of any suitable color. The forward end of the casing 19 may have an opening covered by transparent material 22, such as insinglass or the like. The rear end of the casing may also be covered by a transparent material, if desired.

The casing 19 is provided in its bottom, Fig. 4, with an opening 22, for receiving the upper end of an inner cylindrical casing or tube 23. This casing or tube 23 is provided with an annular horizontal flange or plate 24, rigidly secured thereto, and slightly spaced from the upper end of the tube 23. The bottom of the casing 19 is rigidly secured to the plate 24, by any suitable means, preferably by means of bolts or screws 25, the heads of which are round, and serve to enter the depressions 18.

The inner cylindrical casing or tube 23 is pivotally mounted within the outer casing 16, and is provided at its lower end with a tapered portion 24, leading into a reduced cylindrical portion 25. A cylindrical cap 26 is slidably mounted upon the lower end of the outer casing 16. This cap 26 has a central opening 27, to receive the lower portion 28 of the reduced portion 25. This lower portion 28 is screw threaded, at 29, for receiving a cap nut 30. The reduced portion 25 and cap nut are of course tubular, for the passage of a wire 31. A compressible coil spring 32 is arranged within the cap 26, and engages the bottom thereof and the lower end of the stationary casing 16, thereby serving to urge the plate 24 downwardly against the plate 17.

The numeral 33 designates an electric bulb, the metallic element 33' of which is held within the upper end of the pivoted casing 23, by any suitable means. This upper end may constitute the usual socket of an electric lamp, whereby the filament of the bulb is suitably connected with the wires 31, so that current may be supplied to the bulb. In order that access may be had to the bulb, to remove it from the socket 23, when desired, the top of the casing 19 is equipped with an opening, normally covered by a door 34, hinged at 35, and held closed by a latch 36. This door is equipped with an upstanding knob 37, which functions to open and close the door and also to turn the casing 19 in the desired direction.

In use of the device, the bulb 33 is caused to glow, if it is dark, but of course is extinguished if it is not. The operator by grasping the knob 37, turns the casing 19 to the left, if he is about to turn to the left, or to the right, if turning to the right, as the case may be. When shifted to the selected position, the projections or heads 25 enter the recesses 18, and lock the casing 19 in the selected position. The casing may also be arranged parallel with the car, Fig. 1, and is locked in this position. The spring 32 is sufficiently stiff to hold the casing 19 against accidental displacement, but permits of the proper turning of the casing by means of the knob 37.

It is to be understood that the form of my invention herewith shown and described, is to be taken as a preferred example of the same, and that various changes in the shape, size, and arrangement of parts may be resorted to without departing from the spirit of my invention or the scope of the subjoined claims.

Having thus described my invention, I claim:

1. A signal apparatus for indicating direction, comprising an outer casing provided at its upper end with a flange, said flange having depressions in its top face, an arm serving to hold the casing stationary and adapted to be secured to a part of an automobile, a direction indicating casing provided with openings in its sides, an inner casing projecting into the lower portion of the direction indicating casing, and provided near its upper end with a flange which is secured to the direction indicating casing, said inner casing being pivotally mounted within the outer casing, and having a reduced portion at its lower end projecting downwardly below the outer casing, a cap slidable upon the lower end of the outer casing and having an opening in its bottom to receive the lower end of said reduced portion, a coil spring arranged within the cap outwardly of the reduced portion and engaging the bottom of the cap and the lower end of the outer casing, a cap nut carried by the lower end of said reduced portion and engaging said cap, projections secured to the lower face of the flange of the outer casing and adapted to enter said depressions, an electric bulb held within the upper end of the outer casing and arranged within the direction indicating casing, and a cable extending through the inner casing and having suitable connection with the filament of the bulb.

2. A signal apparatus for indicating direction, comprising an outer casing, an arm for holding the outer casing stationary and adapted to be connected with an automobile, a direction indicating casing provided with openings in its sides, an inner casing connected with the direction indicating casing and pivotally mounted within the outer casing, the inner casing projecting downwardly below the outer casing, a cap having slidable engagement with the lower end of the outer casing and having an opening for the passage therethrough of the inner casing, an element engaging the lower end of the inner casing and engaging the exterior of said cap, a coil spring arranged within the cap and engaging therewith and with the lower end of the outer casing, means whereby the outer and inner casings may be locked against turning movement and released when the inner casing is moved longitudinally in one direction, a bulb arranged within the direction indicating casing and carried by the inner casing, and a cable extending through the inner casing and serving to supply current to said bulb.

3. A signal apparatus for indicating direction, comprising an outer casing provided at its upper end with a horizontal flange, means to hold the outer casing stationary, an inner casing pivotally mounted within the outer casing and provided near its upper end with a flange extending horizontally, said flanges having co-acting holding means, a direction indicating casing carried by the flange of the inner casing and having openings in its sides, a bulb held within the upper end of the inner casing, a cap slidably mounted upon the lower end of the outer casing and connected with the lower end of the inner casing, a spring arranged within the cap and engaging the lower end of the outer casing, and a cable extending through the inner casing and serving to supply current to the bulb.

In testimony whereof I affix my signature.

JOSEPH A. GLANCEY.